United States Patent
Goto et al.

[11] Patent Number: 5,908,515
[45] Date of Patent: Jun. 1, 1999

[54] BEARING COMPONENT

[75] Inventors: Masao Goto, Yao; Atsuhiko Ohta, Kashiwara, both of Japan

[73] Assignees: Koyo Seiko Co., Ltd., Osaka; Daido Steel Co., Ltd., Nagoya, both of Japan

[21] Appl. No.: 08/666,304

[22] PCT Filed: Dec. 20, 1994

[86] PCT No.: PCT/JP94/02149

§ 371 Date: Sep. 6, 1996

§ 102(e) Date: Sep. 6, 1996

[87] PCT Pub. No.: WO95/18239

PCT Pub. Date: Jul. 6, 1995

[30] Foreign Application Priority Data

Dec. 27, 1993 [JP] Japan ..................... 5-330624

[51] Int. Cl.[6] .......................... C22C 38/00; C22C 38/22; C22C 38/12
[52] U.S. Cl. ............................ 148/334; 420/11; 428/544; 384/912
[58] Field of Search .............................. 428/544; 384/907, 384/912, 913; 420/8, 104, 105, 109, 111; 148/320, 333, 334

[56] References Cited

U.S. PATENT DOCUMENTS

| | | | |
|---|---|---|---|
| 3,929,523 | 12/1975 | Kinoshi et al. | 148/143 |
| 4,702,767 | 10/1987 | Takata et al. | 75/49 |
| 4,804,021 | 2/1989 | Hasegawa et al. | 138/171 |
| 5,137,375 | 8/1992 | Murakami et al. | 384/450 |
| 5,261,975 | 11/1993 | Sorstrom et al. | 148/334 |
| 5,352,303 | 10/1994 | Murakami et al. | 148/318 |
| 5,393,358 | 2/1995 | Shikanai et al. | 148/541 |
| 5,413,643 | 5/1995 | Murakami et al. | 148/319 |
| 5,415,705 | 5/1995 | Furumura et al. | 148/319 |

FOREIGN PATENT DOCUMENTS

| | | |
|---|---|---|
| 49-26167 | 7/1974 | Japan . |
| 1283430 | 11/1989 | Japan . |
| 3-254339 | 11/1991 | Japan . |
| 3-254342 | 11/1991 | Japan . |
| 4-362123 | 12/1992 | Japan . |

*Primary Examiner*—John J. Zimmerman
*Assistant Examiner*—Michael LaVilla
*Attorney, Agent, or Firm*—Thelen Reid & Priest

[57] ABSTRACT

A bearing component for use in anti-friction bearings as a bearing ring or rolling member is made from a steel comprising 0.6 to 0.8 wt. % of C, 0.05 to 0.25 wt. % of Si, 0.2 to 0.9 wt. % of Mn, 0.4 to 1.2 wt. % of Cr, one or both of 0.10 to 0.30 wt. % of Mo and 0.03 to 0.10 wt. % of V, and the balance Fe and inevitable impurities. The steel as hardened and tempered contains carbide having a maximum particle size of up to 1.5 μm, and the amount of the carbide is 2 to 7% in area ratio. The steel therefore has improved cold workability, providing bearing components of a prolonged rolling fatigue life at a reduced cost.

11 Claims, 1 Drawing Sheet

BEARING COMPONENT

This application has been filed under 35 U.S.C. 371 from PCT International Application PCT/JP94/02149, filed on 20 Dec. 1994.

TECHNICAL FIELD

The present invention relates to bearing components for use in anti-friction bearings as bearing rings or rolling elements.

BACKGROUND ART

Conventionally, bearing components are prepared from high-carbon chromium steels typical of which is, for example, JIS SUJ2.

However, JIS SUJ2 has a great carbon content and therefore has the problem of being poor in workability and costly. Further because the carbide resulting from hardening and tempering is relatively great in particle size, the steel has another problem of being liable to fluctuations in life.

An object of the present invention is to provide a bearing component which is free of the above problems.

DISCLOSURE OF THE INVENTION

The present invention provides a bearing component made from a steel comprising 0.6 to 0.8 wt. % of C, 0.05 to 0.25 wt. % of Si, 0.2 to 0.9 wt. % of Mn, 0.4 to 1.2 wt. % of Cr, one or both of 0.10 to 0.30 wt. % of Mo and 0.03 to 0.10 wt. % of V, and the balance Fe and inevitable impurities, the bearing component as hardened and tempered containing carbide having a maximum particle size of up to 1.5 $\mu$m, the amount of the carbide being 2 to 7% in area ratio.

The alloy components of the steel are limited for the following reasons.

C: 0.6 to 0.8 wt. %

C has the property of giving an enhanced hardness on quenching, but if the content thereof is less than 0.6 wt. %, there arises the problem that the steel has an insufficient hardness on quenching, unsatisfactory abrasion resistance and diminished load carrying capacity, whereas if the C content is in excess of 0.8 wt. %, difficulty is encountered in the particle size refinement of the carbide, resulting in fluctuations in rolling life and entailing impaired cold workability due to increased deformation resistance. Moreover, an increased cost will result. Accordingly, the C content should be within the range of 0.6 to 0.8 wt. %, more preferably within the range of 0.65 to 0.75 wt. %.

Si: 0.05 to 0.25 wt. %

Si has the property of shortening the time required for deoxidation. When the content thereof is less than 0.05 wt. %, deoxidation requires a longer period of time to result in an increased cost. If the Si content is over 0.25 wt. %, on the other hand, it becomes difficult to spheroidize the carbide, permitting formation of network carbide and leading to impaired cold workdability due to increased deformation resistance. Accordingly, the Si content should be within the range of 0.05 to 0.25 wt. %, more preferably within the range of 0.10 to 0.20 wt. %.

Mn: 0.2 to 0.9 wt. %

Mn has the property of giving improved hardenability. If the content thereof is less than 0.2 wt. %, this effect diminishes. On the other hand, Mn contents over 0.9 wt. % result in lower toughness and impaired workability. Accordingly, the Mn content should be within the range of 0.2 to 0.9 wt. %, more preferably within the range of 0.2 to 0.5 wt. %.

Cr: 0.4 to 1.2 wt. %

Cr has the property of affording improved strength. If the content thereof is less than 0.4 wt. %, it becomes difficult to spheroidize the carbide, permitting formation of network carbide. If the Cr content is over 1.2 wt. %, a higher cost results, while the effect to give increased strength levels off. For this reason, the Cr content should be within the range of 0.4 to 1.2 wt. %, more preferably within the range of 1.0 to 1.2 wt. %.

One or both of 0.10 to 0.30 wt. % of Mo and 0.03 to 0.10 wt. % of V

Mo and V compensate for the impairment of hardenability that is attributable to the contents of the foregoing alloy components which are made lesser than in the usual material JIS SUJ2, and also have the property of forming a structure of finer grains. When the Mo content is less than 0.10 wt. % with the V content below 0.03 wt. %, these effects are not fully available. When the Mo content is over 0.30 wt. % with the V content in excess of 0.10 wt. %, a higher cost will result. Accordingly, the Mo content should be within the range of 0.10 to 0.30 wt. %, and the V content within the range of 0.03 to 0.10 wt. %. It is especially desirable that 0.15 to 0.25 wt. % of Mo and 0.03 to 0.05 wt. % of V be present.

The maximum particle size of the carbide resulting from hardening and tempering is limited to not greater than 1.5 $\mu$m because if the maximum particle size is in excess of 1.5 $\mu$m, a shortened rolling fatigue life will result. More specifically, we have conducted experiments and research and consequently established the relationship between the maximum particle size of carbide in bearing components and the rolling fatigue life (in the presence of grease for lubrication) as shown in FIG. 1 to find that if the maximum carbide particle size is in excess of 1.5 $\mu$m, the rolling fatigue life becomes shortened. It is especially desirable that the maximum carbide particle size be up to 1.0 $\mu$m. In FIG. 1, the solid line represents a case wherein the amount of carbide is 2% in area ratio, and the broken line a case wherein the amount of carbide is 7% in area ratio.

Furthermore, the amount of carbide resulting from hardening and tempering is limited to 2 to 7% in area ratio for the following reason. The experiments and research carried out by us have established the relationship between the amount of carbide in bearing components and the amount of wear as shown in FIG. 2. We have found that if the amount of carbide in the bearing component is less than 2% in area ratio, the component wears away greatly, exhibiting reduced abrasion resistance. FIG. 3 shows the relationship between the amount of carbide in bearing components and the rolling fatigue life (with grease for lubrication), revealing that if the amount of carbide is over 7% in area ratio, a shortened rolling fatigue life results. It is especially preferable that the amount of carbide be 3 to 5% in area ratio.

Such bearing components are produced, for example, by the following two methods.

According to one of the production methods, a steel bar subjected to a spheroidizing treatment is cut to a predetermined dimension, and the cut piece is made into a ring by cold forging and further shaped to a specified form by turning. The shaped piece is then heated at 850° C. for 30 to 40 minutes, thereafter quenched for hardening, and finally heated at 160° to 180° C. for 1 to 2 hours for tempering, whereby a bearing component is produced.

According to the other production method, a rolled steel bar is cut to a predetermined dimension, and the workpiece is made into a ring by hot forging. The ring is then heated at 760° C. for 6 to 7 hours, thereafter cooled in a furnace to 680° C. at a cooling rate of 10° C./hr and further cooled in air for spheroidizing. Subsequently, the ring is shaped to a specified form by turning. The shaped piece is heated at 850° C. for 30 to 40 minutes, thereafter quenched for hardening, and finally heated at 160° to 180° C. for 1 to 2 hours for tempering, whereby a bearing component is produced.

The bearing component is made from a steel comprising 0.6 to 0.8 wt. % of C, 0.05 to 0.25 wt. % of Si, 0.2 to 0.9 wt. % of Mn, 0.4 to 1.2 wt. % of Cr, one or both of 0.10 to 0.30 wt. % of Mo and 0.03 to 0.10 wt. % of V, and the balance Fe and inevitable impurities. The bearing component as hardened and tempered contains carbide, 1.5 µm in maximum particle size, in an amount of 2 to 7% in terms of area ratio. As compared with conventional high-carbon chromium bearing steels such as JIS SUJ2, the steel is superior in cold workability to provide bearing components which are prolonged in rolling fatigue life and yet less costly.

BEST MODE OF CARRYING OUT THE INVENTION

Figure 1:
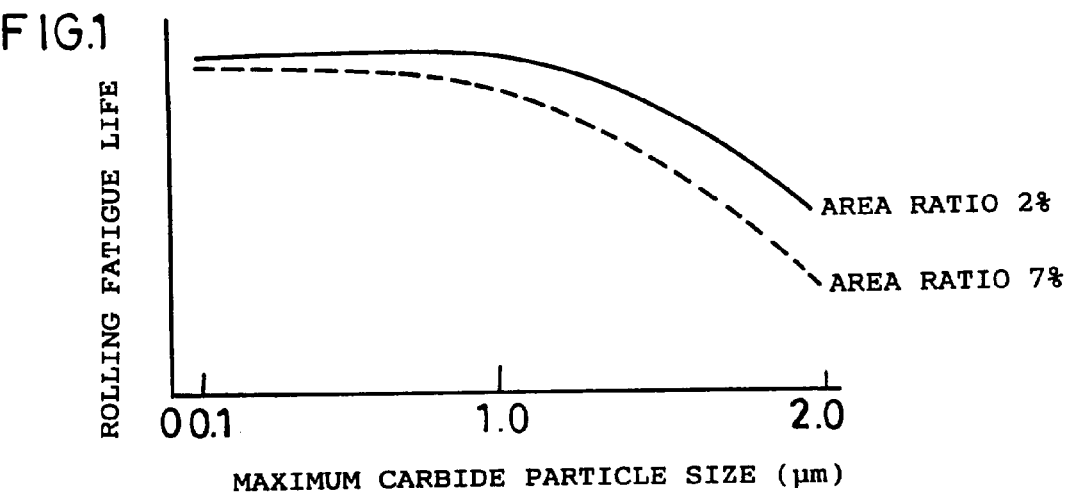
FIG. 1 is a graph showing the relationship between the maximum particle size of carbide in bearing components and the rolling fatigue life.
Figure 2:
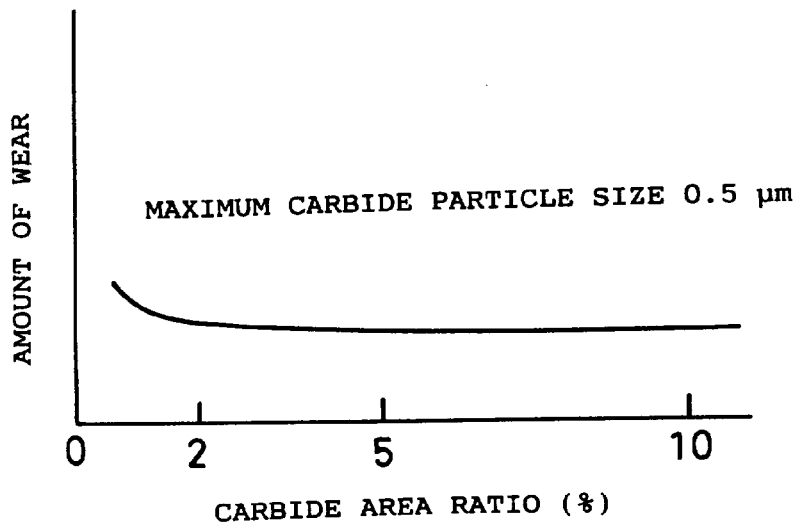
FIG. 2 is a graph showing the relationship between the amount of carbide in bearing components and the amount of wear.
Figure 3:
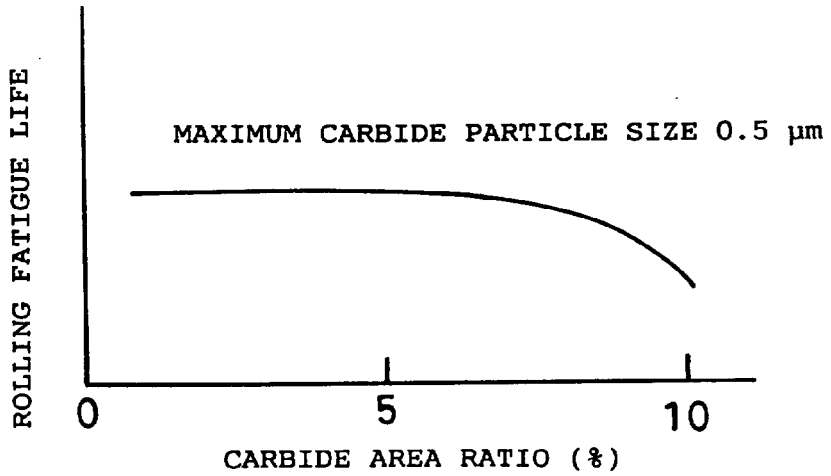
FIG. 3 is a graph showing the relationship between the amount of carbide in bearing components and the rolling fatigue life.

Examples of the invention are given below along with comparative examples.

TABLE 1

| | Composition of Material (wt. %) | | | | | | | | |
|---|---|---|---|---|---|---|---|---|---|
| | Fe | C | Si | Mn | P | S | Cr | Mo | V |
| Example | | | | | | | | | |
| 1 | Bal | 0.66 | 0.12 | 0.21 | 0.015 | 0.004 | 1.19 | 0.20 | — |
| 2 | Bal | 0.71 | 0.18 | 0.54 | 0.013 | 0.005 | 0.98 | 0.17 | — |
| 3 | Bal | 0.78 | 0.09 | 0.84 | 0.013 | 0.006 | 0.56 | 0.15 | — |
| 4 | Bal | 0.70 | 0.11 | 0.29 | 0.013 | 0.005 | 1.00 | 0.05 | 0.05 |
| 5 | Bal | 0.65 | 0.13 | 0.55 | 0.013 | 0.005 | 0.46 | 0.12 | 0.05 |
| Comp. Ex. | | | | | | | | | |
| 1 | Bal | 1.01 | 0.24 | 0.42 | 0.013 | 0.004 | 1.36 | 0.01 | — |
| 2 | Bal | 0.70 | 0.16 | 0.43 | 0.013 | 0.005 | 0.96 | 0.03 | — |
| 3 | Bal | 0.69 | 0.25 | 1.12 | 0.014 | 0.007 | 0.37 | 0.02 | — |
| 4 | Bal | 0.98 | 0.22 | 0.51 | 0.016 | 0.005 | 1.41 | 0.15 | — |
| 5 | Bal | 0.75 | 0.77 | 0.31 | 0.015 | 0.005 | 0.50 | 0.10 | — |

Disklike samples, 65 mm in diameter and 11 mm in thickness, were prepared from bars of ten different steels having the respective compositions listed in Table 1, by subjecting each steel bar to a spheroidizing treatment, thereafter cutting the bar to a predetermined dimension, then making the bar into a plate by cold forging and machining the plate by turning. The steel of Comparative Example 1 in Table 1 JIS SUJ2. Subsequently, each sample was heated at 850° C. for 40 minutes and thereafter quenched in oil for hardening. Finally the sample was heated at 160° C. for 2 hours and thereby tempered. The maximum particle size of the carbide in the sample and the area ratio of the carbide were measured. Table 2 shows the result.

TABLE 2

| | Maximum carbide particle size (µm) | Carbide area ratio (%) |
|---|---|---|
| Example | | |
| 1 | 0.75 | 3.6 |
| 2 | 0.81 | 6.6 |
| 3 | 0.94 | 3.9 |
| 4 | 0.82 | 3.8 |
| 5 | 0.69 | 3.4 |
| Comp. Ex. | | |
| 1 | 2.50 | 8.3 |
| 2 | 0.95 | 5.8 |
| 3 | 0.70 | 0.9 |
| 4 | 1.95 | 8.9 |
| 5 | 0.75 | 4.7 |

An assembly of each of the samples, a disk of JIS SUJ2 and balls of JIS SUJ2 in combination was tested for rolling fatigue life in spindle oil #60 with use of a rolling fatigue life tester of the thrust type, by rotating the JIS SUJ2 disk at a speed of 1800 c.p.m. to thereby roll the JIS SUJ2 balls while applying a thrust load to the sample to produce a contact stress of 5320 MPa. The ratio of the life of each sample to $B_{10}$ life of the sample prepared from the bearing steel (JIS SUJ2) of Comparative Example 1 was determined, the life the the comparative sample being calculated as 1. The result is given in Table 3.

A solid cylindrical sample, 6 mm in diameter and 12 mm in length, was prepared from each of ten different steel materials having the respective compositions shown in Table 1 after subjecting the material to a spheroidizing treatment. At a temperature of 25° C., the sample was deformed by restrained compression at compressibility of 60% to measure the deformation resistance and determine the ratio of the resistance to the deformation resistance of the sample prepared from the bearing steel of Comparative Example 1, the latter resistance being calculated as 1. The result is given in Table 3.

Further each of solid cylindrical samples prepared in the same manner as above was deformed by restrained compression at a temperature of 25° C. while varying the compressibility stepwise, by 5% at a time, to determine the lowest compressibility (limiting compressibility) at which the sample developed a crack. Table 3 also shows the result.

TABLE 3

| | Life ratio | Deformation resistance ratio | Limiting compressibility |
|---|---|---|---|
| Example | | | |
| 1 | 2.2 | 0.88 | 78% |
| 2 | 1.5 | 0.91 | 75% |
| 3 | 1.8 | 0.93 | 75% |
| 4 | 2.0 | 0.87 | 76% |
| 5 | 1.5 | 0.85 | 80% |

TABLE 3-continued

|  | Life ratio | Deformation resistance ratio | Limiting compressibility |
|---|---|---|---|
| Comp. Ex. | | | |
| 1 | 1 | 1 | 70% |
| 2 | 0.86 | 0.95 | 73% |
| 3 | 0.85 | 1.08 | 68% |
| 4 | 1.4 | 1.11 | 70% |
| 5 | 1.5 | 1.20 | 68% |

INDUSTRIAL APPLICABILITY

The bearing components of the present invention are suitable for use in anti-friction bearings as bearing rings and rolling members.

We claim:

1. A bearing component made from a steel consisting essentially of 0.6 to 0.8 wt. % of C, 0.05 to 0.25 wt. % of Si, 0.2 to 0.9 wt. % of Mn, 0.4 to 1.2 wt, % of Cr, one or both of 0.10 to 0.30 wt. % of Mo and 0.03 to 0.10 wt. % of V, and of the balance Fe and inevitable impurities, wherein the bearing component has been hardened and tempered and contains carbide having a maximum particle size of up to 1.5 μm, the amount of the carbide being 2 to 7% in area ratio.

2. A bearing component as defined in claim 1 which has a C content of 0.65 to 0.75 wt. %.

3. A bearing component as defined in claim 1 which has an Si content of 0.10 to 0.20 wt. %.

4. A bearing component as defined in claim 1 which has an Mn content of 0.2 to 0.5 wt. %.

5. A bearing component as defined in claim 1 which has a Cr content of 1.0 to 1.02 wt. %.

6. A bearing component as defined in claim 1 which has an Mo content of 0.15 to 0.25 wt. %.

7. A bearing component as defined in claim 1 which has a V content of 0.03 to 0.05 wt. %.

8. A bearing component as defined in claim 1 wherein the maximum particle size of the carbide is up to 1.0 μm.

9. A bearing component as defined in claim 1 wherein the amount of the carbide is 3 to 5% in area ratio.

10. The bearing component of claim 1 having a Mo content of 0.10 to 0.30 wt. % and a V content of 0.03 to 0.10 wt. %.

11. The bearing component of claim 1 having a Mo content of 0.15 to 0.25 wt. % and a V content of 0.03 to 0.05 wt. %.

* * * * *